United States Patent
Nakatsu et al.

(10) Patent No.: US 8,280,568 B2
(45) Date of Patent: Oct. 2, 2012

(54) ELECTRIC TRAIN CAR CONTROLLING DEVICE

(75) Inventors: Keiji Nakatsu, Tokyo (JP); Masataka Yabuuchi, Tokyo (JP)

(73) Assignee: Mitsubishi Electric Corporation, Chiyoda-Ku, Tokyo (JP)

(*) Notice: Subject to any disclaimer, the term of this patent is extended or adjusted under 35 U.S.C. 154(b) by 335 days.

(21) Appl. No.: 12/677,967

(22) PCT Filed: Sep. 18, 2007

(86) PCT No.: PCT/JP2007/068103
§ 371 (c)(1),
(2), (4) Date: Mar. 12, 2010

(87) PCT Pub. No.: WO2009/037740
PCT Pub. Date: Mar. 26, 2009

(65) Prior Publication Data
US 2010/0305787 A1 Dec. 2, 2010

(51) Int. Cl.
*B60L 15/20* (2006.01)
(52) U.S. Cl. .......................... 701/19; 318/52
(58) Field of Classification Search .......... 701/19, 701/20, 74, 82; 318/52, 798, 806, 808; 303/151, 303/177; 180/197, 65.51
See application file for complete search history.

(56) References Cited

U.S. PATENT DOCUMENTS

| | | | |
|---|---|---|---|
| 4,298,940 A * | 11/1981 | Tadokoro et al. | 701/82 |
| 4,588,932 A * | 5/1986 | Riondel | 318/52 |
| 4,896,090 A | 1/1990 | Balch et al. | |
| 6,152,546 A | 11/2000 | Daigle | |
| 6,208,097 B1 | 3/2001 | Readdy et al. | |
| 6,274,998 B1 * | 8/2001 | Kaneko et al. | 318/802 |
| 6,499,815 B1 * | 12/2002 | Daigle | 303/151 |
| 2002/0005304 A1 | 1/2002 | Bachman et al. | |
| 2006/0219454 A1 | 10/2006 | Itoh et al. | |

FOREIGN PATENT DOCUMENTS

| | | |
|---|---|---|
| AU | 749036 B2 | 6/2002 |
| DE | 102 38 216 A1 | 11/2003 |

(Continued)

OTHER PUBLICATIONS

Notice of Allowance (Decesion on Grant Patent for Invention) from Russian Patent Office issued in corresponding Russian Patent Application No. 2010115368/00(021777) dated Jun. 3, 2011, with an English translation thereof.

International Search Report (PCT/ISA/210) dated Dec. 25, 2007 corresponding to PCT/JP2007/068103.

(Continued)

*Primary Examiner* — Thomas Black
*Assistant Examiner* — Marthe Marc-Coleman
(74) *Attorney, Agent, or Firm* — Buchanan Ingersoll & Rooney PC

(57) ABSTRACT

A first threshold is determined, with reference to an absolute acceleration that is determined in accordance with a vehicle usage condition, to detect an acceleration change generated in acceleration of a self-axle speed that is a maximum speed (a minimum speed in a decelerating operation) of revolving speeds of plural motors that drive plural driving wheel axles. When the acceleration exceeds the first threshold, a system for generating a target torque command value reduced in accordance with the acceleration deviation is separated by setting an output of a comparator circuit to level "0", and a first-order delay circuit outputs the target torque command value subjected to a reduction process during a processing period designated by an output of a delay time generating circuit.

18 Claims, 2 Drawing Sheets

FOREIGN PATENT DOCUMENTS

| | | |
|---|---|---|
| EP | 0 794 097 A2 | 9/1997 |
| JP | 63-217904 A | 9/1988 |
| JP | 10-215505 A | 8/1998 |
| JP | 11-69506 A | 3/1999 |
| JP | 11-89005 A | 3/1999 |
| JP | 2003-164016 A | 6/2003 |
| JP | 2006-283591 A | 10/2006 |
| RU | 2025310 C1 | 12/1994 |
| RU | 2 179 515 C2 | 2/2002 |
| SU | 481472 A1 | 8/1975 |

OTHER PUBLICATIONS

Written Opinion (PCT/ISA/237) dated Dec. 25, 2007 corresponding to PCT/JP2007/068103.

Extended Search Report from European Patent Office issued in corresponding European Patent Application No. 07828250.6 dated Feb. 28, 2011.

Extended Search Report dated Jul. 5, 2012 from European Patent Office, issued in corresponding European Application No. 11183409.9-2207.

* cited by examiner

ELECTRIC TRAIN CAR CONTROLLING DEVICE

TECHNICAL FIELD

The present invention relates to an electric train car controlling device that performs inverter control on induction motors that drive wheels of an electric train car. The present invention particularly relates to an electric train car controlling device that has a controlling function on idling during power running operation and sliding during braking operation.

BACKGROUND ART

In an electric train car controlling device, the torque of induction motors needs to be suitably controlled such that idling of wheels would not occur to achieve smooth acceleration during power running operation. Patent Document 1, for example, discloses an example structure of an electric train car controlling device for controlling idling during power running operation. The electric train car controlling device drives four induction motors for driving four driving wheel axles with a single inverter.

Specifically, the conventional electric train car controlling device calculates the speed of each axle on the basis of a detection signal detected by a corresponding one of four pulse generators that individually detect the number of revolutions of the four induction motors. Then, the maximum axle speed and the minimum axle speed are selected from the four axle speeds, and a speed deviation $\Delta V$ is calculated. Also, the minimum axle speed selected from the four axle speeds is defined as a reference speed $V0$, reference acceleration $a0$ is calculated from the reference speed $V0$, and accelerations $\alpha 1$ to $\alpha 4$ of the axles are calculated from the four axle speeds.

Based on the thus calculated speed deviation $\Delta V$, the reference speed $V0$, the reference acceleration $\alpha 0$, and the axle accelerations $\alpha 1$ to $\alpha 4$, it is judged whether any wheels of the corresponding axles are in an idling state. For example, in a case where idling occurs at one axle, the idling is detected when the speed deviation $\Delta V$ exceeds a set value or when any of the axle accelerations $\alpha 1$ to $\alpha 4$ exceeds the reference acceleration $\alpha 0$ that is an idling detection level. When an idling state is detected, a limiting operation is performed such that a current command value that is supplied from the inverter to the induction motor is temporarily reduced from the original value (target value). Thus, an abnormal vibration phenomenon is prevented from occurring in the electric train car at the time of idling.

[Patent Document 1] Japanese Patent Application Laid-open No. 11-89005 (paragraphs [0002] to [0006], FIG. 19)

DISCLOSURE OF INVENTION

Problem to be Solved by the Invention

In the above described conventional idling control, in which the idling is detected based on the deviation between the axle acceleration and the reference acceleration, the change of the acceleration (deviation) can be accurately detected when the acceleration significantly changes. For example, the change in acceleration is as large as the predetermined acceleration: the acceleration changes from 3.0 km/h/s to 5.0 km/h/s due to the idling when the predetermined acceleration is 4.0 km/h/s. Then, the idling detection function suitably operates to temporarily limit the current command value. However, when the predetermined acceleration is 4.0 km/h/s and the acceleration changes from 3.9 km/h/s to 4.1 km/h/s, for example, the change of the acceleration may not be accurately detected because the change (deviation) of the acceleration caused by the idling is relatively small with respect to the predetermined acceleration.

In the situation in which appropriate detection of an acceleration change caused by idling cannot be conducted, the speed cannot be controlled appropriately, which may cause vibration of the electric train car, the activation of the safety device, or even the activation of the emergency brake. These make it difficult for the electric train car to perform a stable travel. The above phenomenon similarly applies to the sliding control at the time of braking (decelerating).

The present invention has been made in view of the above. An object of the present invention is to provide an electric train car controlling device that can reliably detect an idling state/a sliding state and suitably perform a torque control even when a change in acceleration/deceleration is too small as the acceleration/deceleration of an electric train car to detect the change using an acceleration/deceleration deviation.

Means for Solving Problem

An electric train car controlling device according to an aspect of the present invention has a controlling unit that generates a target torque command value for a plurality of motors to suppress an idling state of driving wheels based on revolving speeds of the motors that drive a plurality of driving wheel axles, wherein the controlling unit includes a first judging unit that obtains, by use of self-axle speeds that are the revolving speeds of the motors and a reference speed that is a minimum speed of the revolving speeds of the motors, a speed deviation of each of the self-axle speeds from the reference speed and an acceleration deviation, and judges a degree of the idling state of the driving wheels in accordance with how much the thus obtained speed deviation and the acceleration deviation exceed thresholds that are individually determined; a limiting process performing unit that performs a limiting process to reduce an instruction torque command value that is externally supplied, in accordance with a judgment result obtained by the first judging unit; a second judging unit that determines a first threshold that exceeds an absolute acceleration determined in accordance with a vehicle usage condition with reference to the absolute acceleration, and judges whether an acceleration of a self-axle speed that is the maximum speed selected from the revolving speeds of the motors exceeds the first threshold; and an output processing unit that outputs a torque command value processed by the limiting process performing unit as the target torque command value when a judgment result obtained by the second judging unit is "not exceeding the first threshold", and outputs the target torque command value subjected to a reduction process that is performed regardless of a process result obtained by the limiting process performing unit when the judgment result obtained by the second judging unit is "exceeding the first threshold".

EXPLANATIONS OF LETTERS OR NUMERALS

Figure 1:
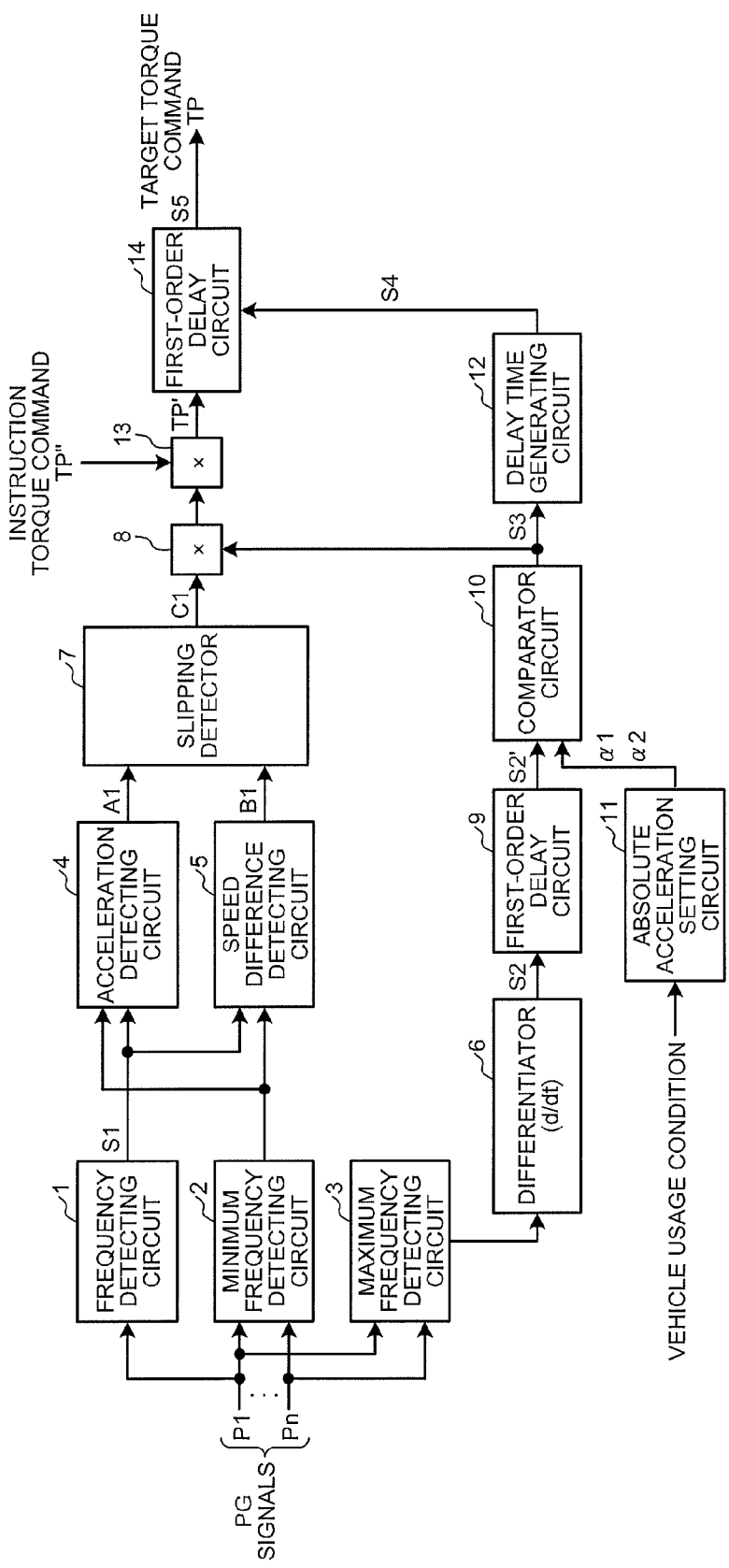
FIG. 1 is a block diagram showing a partial structure of an electric train car controlling device according to an embodiment of the present invention.

1 Frequency detecting circuit
2 Minimum frequency detecting circuit

3 Maximum frequency detecting circuit
4 Acceleration detecting circuit
5 Speed difference detecting circuit
6 Differentiator
7 Slipping detector
8 Multiplier
9 First-order delay circuit
10 Comparator circuit
11 Absolute acceleration setting circuit
12 Delay time generating circuit
13 Multiplier
14 First-order delay circuit

BEST MODE(S) FOR CARRYING OUT THE INVENTION

Exemplary embodiments of an electric train car controlling device according to the present invention are described in detail below with reference to the drawings. The entire structure of an electric train car controlling device basically includes a power converting unit, to which plural induction motors that drive plural driving wheel axles that are under control are connected in parallel; a controlling unit that judges an idling state/a sliding state at the time of power running operation/braking operation based on detection signals (PG signals) of pulse generators (PGs) that detect respective number of revolutions of plural induction motors and outputs a target torque command TP to cancel such states; and a calculating unit that calculates a drive signal in accordance with the target torque command TP output by the controlling unit and supplies it to a switching circuit of the power converting unit. The induction motors are connected in parallel to an output terminal of the switching circuit.

FIG. 1 is a block diagram showing a partial structure of an electric train car controlling device according to the embodiment of the present invention. To facilitate understanding of this invention, the description of the following embodiment deals with a case in which the controlling unit, which is a main component, performs idling control at the time of power running operation (accelerating operation), but it is similarly applicable to a case of sliding control at the time of braking operation (decelerating operation).

In FIG. 1, PG signals P1 to Pn are detection signals from plural pulse generators (PGs). Each of the pulse generators detects the number of revolutions of corresponding one of induction motors. Each of the motors drives corresponding one of driving wheel axles that is under control. In other words, the PG signals P1 to Pn are speed signals that indicate the revolving speeds of the corresponding induction motors, i.e., the revolving speeds of the corresponding driving wheels.

A plurality of frequency detecting circuits 1 is provided in a one-to-one correspondence with PG signals P1 to Pn, but one of them is illustrated in FIG. 1. In FIG. 1, one of the PG signals P1 to Pn (PG signal P1) is input into the frequency detecting circuit 1. All the PG signals P1 to Pn are input in parallel into a minimum frequency detecting circuit 2 and a maximum frequency detecting circuit 3.

The frequency detecting circuit 1 detects the frequency of the corresponding PG signal (PG signal P1 in FIG. 1) in the PG signals P1 to Pn and outputs it to corresponding one of acceleration detecting circuits 4 and speed difference detecting circuits 5. Although not illustrated in FIG. 1, a plurality of acceleration detecting circuits 4 and a plurality of speed difference detecting circuits 5 is provided in a one-to-one correspondence with the PG signals P1 to Pn similarly to the frequency detecting circuits 1. Each one of the respective circuits are illustrated in FIG. 1.

The minimum frequency detecting circuit 2 detects the minimum frequency from the PG signals P1 to Pn, and outputs it to the acceleration detecting circuits 4 and the speed difference detecting circuits 5 in parallel. In contrast, the maximum frequency detecting circuit 3 detects the maximum frequency from the PG signals P1 to Pn and outputs it to a differentiator 6.

Each of the acceleration detecting circuits 4 calculates the acceleration (hereinafter, referred to as "reference acceleration" for convenience) by performing a differential processing on the revolving speed of the driving wheel axle having the minimum frequency that has been detected by the minimum frequency detecting circuit 2. In parallel with this, each of the acceleration detecting circuits 4 calculates the acceleration (hereinafter, referred to as "self-axle acceleration" for convenience) by performing a differential processing on the revolving speed (hereinafter, referred to as "self-axle speed" for convenience) S1 of the driving wheel axle detected by the corresponding one of the frequency detecting circuits 1.

Then, each of the acceleration detecting circuits 4 calculates an acceleration deviation between the self-axle acceleration and the reference acceleration, compares the calculated acceleration deviation with a predetermined threshold, notifies an slipping detector 7 that the acceleration is normal when the acceleration deviation does not exceed the predetermined threshold, and notifies the slipping detector 7 that the acceleration is abnormal when the acceleration deviation exceeds the predetermined threshold, with the exceeding value attached.

Each of the speed difference detecting circuits 5 calculates a difference between the revolving speed of the driving wheel axle having the minimum frequency detected by the minimum frequency detecting circuit 2 and the self-axle speed detected by the corresponding one of the frequency detecting circuits 1, compares the speed difference with a predetermined threshold, notifies the slipping detector 7 that the speed difference is normal when the speed difference does not exceed the predetermined threshold, and notifies the slipping detector 7 that the speed difference is abnormal when the speed difference exceeds the predetermined threshold, with the exceeding value attached.

Notification A1 indicating "normal" or "abnormal" of the acceleration of corresponding one of the driving wheel axles is input from each of the acceleration detecting circuit 4, and notification B1 indicating "normal" or "abnormal" of the speed difference of corresponding one of the driving wheel axles is input from each of the detecting circuit 5. Based on these notifications, the slipping detector 7 determines the degrees of idling for all the driving wheel axles. For example, if idling is not detected, a value "1" is set. If idling is detected, a specific value between "1" and "0" is set in accordance with the degree of abnormality indicated by the outputs of the acceleration detecting circuit 4 and the speed difference detecting circuit 5. An idling detection signal C1 for all the driving wheel axles indicating the degree of idling thus determined is input to a multiplier 8.

The differentiator 6 calculates the acceleration (hereinafter, referred to as "maximum acceleration" for convenience) S2 by differentiating the revolving speed of the driving wheel axle having the maximum frequency that is detected by the maximum frequency detecting circuit 3 and outputs it to a first-order delay circuit 9.

The first-order delay circuit 9 is a filter that removes noise components from the maximum acceleration signal S2 output by the differentiator 6. The first-order delay circuit 9 introduces a delay of a predetermined time constant to the maximum acceleration signal S2', from which the noise components has removed, and outputs it to one of the input terminals of the comparator circuit 10.

The absolute acceleration setting circuit 11 is a circuit that sets an absolute acceleration in accordance with a vehicle usage condition that is externally input. The absolute acceleration setting circuit 11 outputs to the other one of the input terminals of the comparator circuit 10 two thresholds (a maximum acceleration threshold $\alpha 1$ as a first threshold and a minimum acceleration threshold $\alpha 2$ as a second threshold) that are determined above and below the set absolute acceleration using the set absolute acceleration as a reference value. In other words, the two thresholds (the maximum acceleration threshold $\alpha 1$ and the minimum acceleration threshold $\alpha 2$) change in accordance with the absolute acceleration that is set in accordance with the vehicle usage condition.

The comparator circuit 10 has a hysteresis function. The output is set to a set level (the logical value "0" level in the example of FIG. 1) when the maximum acceleration signal S2' input by the first-order delay circuit 9 exceeds the maximum acceleration threshold $\alpha 1$ supplied by the absolute acceleration setting circuit 11, and thereafter, when the maximum acceleration signal S2' falls below the minimum acceleration threshold $\alpha 2$ supplied by the absolute acceleration setting circuit 11, the output is set back to a reset level (the logical value "1" in the example of FIG. 1).

In other words, an acceleration change that is too small to be detected from an acceleration deviation (mild change in acceleration) with the conventional technology is detected by the absolute acceleration setting circuit 11 and the comparator circuit 10. The output S3 of the comparator circuit 10 is input to the other terminal of the multiplier 8, and also input to a delay time generating circuit 12.

The multiplier 8 multiplies the idling detection signal C1, which is the output of the slipping detector 7, by the output S3 of the comparator circuit 10, and supplies the multiplication result to one of the input terminals of a multiplier 13. This means that, when the logical value of the output S3 of the comparator circuit 10 is the reset level (level "1"), the idling detection signal C1 output by the slipping detector 7 is input to the input terminal of the multiplier 13 as it is, and when the logical value of the output S3 of the comparator circuit 10 is the set level (level "0"), the value "0" is input during a period in which the logical value of the output S3 of the comparator circuit 10 is at the set level.

An instruction torque command TP''' is externally input to the other input terminal of the multiplier 13 in accordance with commands and speeds. During a period in which the input from the multiplier 8 is the value "0", the multiplier 13 outputs a value "0" to a first-order delay circuit 14. When the logical value of the output S3 of the comparator circuit 10 is the reset level ("1" level), the multiplier 13 converts the externally input instruction torque command TP''' to an instruction torque command TP' by performing reduction or the like thereon in accordance with the degree of idling indicated by the idling detection signal C1 that is input by the multiplier 8, and outputs the instruction torque command TP' to the first-order delay circuit 14.

The delay time generating circuit 12 outputs a first level signal corresponding to the reset level when the comparator circuit 10 maintains the reset level without changing the output level. However, when the comparator circuit 10 changes the output level from the reset level to the set level, the delay time generating circuit 12 outputs a second level signal corresponding to the set level and maintains the second level for a certain period of time after the timing at which the output level has been changed to the set level. The delay time generating circuit 12 maintains the second level even after the comparator circuit 10 puts the output level back to the reset level. After the certain period of time elapses, the first level signal corresponding to the restored reset level is output. The output S4 of the delay time generating circuit 12 is input to the first-order delay circuit 14 as a control signal.

When the output level of the delay time generating circuit 12 is unchanged and maintained at the first level, the first-order delay circuit 14 directly outputs the instruction torque command TP', to which reduction or the like is performed at the multiplier 13, as a target torque command TP.

In contrast, when the output level of the delay time generating circuit 12 is changed from the first level to the second level, the first-order delay circuit 14 keeps applying a large reduction processing on the target torque command value TP, which has been sent out immediately before, during a period of time in which the output level of the delay time generating circuit 12 is maintained at the second level. This is performed independently of the instruction torque command TP' on which the reduction or the like is performed at the multiplier 13. The first-order delay circuit 14 outputs the thus largely limited target torque command TP. When the output level of the delay time generating circuit 12 returns to the original first level, the above-mentioned limiting is terminated. The first-order delay circuit 14 returns to the operation in which the instruction torque command TP' is output as it is, to which the reduction or the like is performed at the multiplier 13, as the target torque command TP.

The target torque command TP that is output by the above-described first-order delay circuit 14 is input to the not-shown calculating unit, and reduction or the like is performed on the supply current to all the induction motors at the power converting unit. The output torques given to all the driving wheel axles are thereby controlled.

Here, the correspondence with the claims is specified. The frequency detecting circuits 1, the minimum frequency detecting circuit 2, the acceleration detecting circuits 4, the speed difference detecting circuits 5, and the slipping detector 7 as a whole form a first judging unit. The absolute acceleration setting circuit 11 and the comparator circuit 10 as a whole form a second judging unit. The multiplier 8 forms a process switching unit. The multiplier 13 forms a limiting process performing unit. The first-order delay circuit 14 forms an output processing unit. The delay time generating circuit 12 forms a process managing unit.

In the above structure, idling control is performed by the plurality of frequency detecting circuits 1, the minimum frequency detecting circuit 2, the plurality of acceleration detecting circuits 4, the plurality of speed difference detecting circuits 5, the slipping detector 7, the multiplier 13, and the first-order delay circuit 14 based on the acceleration deviation and the speed deviation when a significant acceleration change occurs in acceleration of an electric train car during power running operation.

The idling control performed when a small acceleration change appears in the acceleration of an electric train car during power running operation is the idling control according to the present embodiment. This is realized by the maximum frequency detecting circuit 3, the differentiator 6, the first-order delay circuit 9, the absolute acceleration setting circuit 11, the comparator circuit 10, the multiplier 8, the delay time generating circuit 12, and the first-order delay circuit 14.

Figure 2:
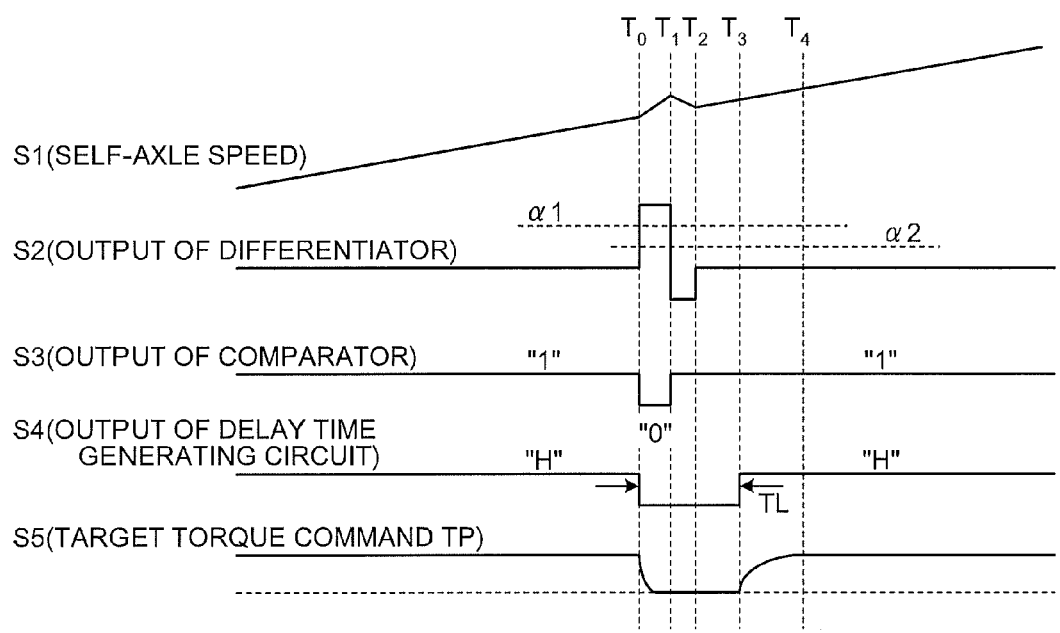
FIG. 2 is a time chart diagram showing an idling control operation.

Next, the idling control operation according to the present embodiment is described with FIG. 2, while referring to FIG.

1. FIG. 2 is a time chart diagram showing the idling control operation. To facilitate understanding, the operation of each unit at the time of idling in one axle is illustrated in FIG. 2.

As shown by S1 (self-axle speed) in FIG. 2, when the revolving speed (self-axle speed) detected for one of the driving wheel axles (the driving wheel axle having the maximum frequency in the present example) is increasing steadily at a substantially fixed predetermined acceleration and a small acceleration change occurs due to idling at time T0, the idling control operation according to the present embodiment is activated. The acceleration change increases up to time T1, then is shifted to decreasing, and disappears at time T2. The period between times T0 and T3 is the operation period of the idling control operation according to the present embodiment.

The maximum frequency detecting circuit 3 detects the driving wheel axle having the maximum frequency from the driving wheel axles driving at the predetermined acceleration, and outputs the maximum frequency to the differentiator 6 at each detection. In this process, a small frequency change incurred by the event of idling at time T0 can be detected by the maximum frequency detecting circuit 3, and the acceleration S2 is obtained by the differentiator 6 and input through the first-order delay circuit 9 to the comparator circuit 10.

In FIG. 2, the change in the acceleration S2 (the output of the differentiator) of the idling driving wheel axle detected by the maximum frequency detecting circuit 3 is indicated with the maximum acceleration threshold α1 and the minimum acceleration threshold α2 that are set to the comparator circuit 10 by the absolute acceleration setting circuit 11.

As shown by S3 (the output of the comparator) in FIG. 2, the comparator circuit 10 keeps the output level at the reset level of the logical value "1" (hereinafter, "normal state") up to the time T0 at which the idling control is performed based on the idling detection signal C1. Thus, the multiplier 8 supplies the idling detection signal C1 from the slipping detector 7 directly to the multiplier 13, and therefore the multiplier 13 outputs to the first-order delay circuit 14 the instruction torque command TP' that is obtained by performing a limiting process or the like on the externally input instruction torque command TP" in accordance with the idling detection signal C1.

As shown by S4 (the output of the delay time generating circuit) in FIG. 2, the delay time generating circuit 12 keeps the output level at the aforementioned first level that is the high level (hereinafter, ""H" level") until the time T0, i.e., during the normal state. Thus, as shown by S5 (the target torque command TP) in FIG. 2, the target torque command TP', on which the limiting process or the like is performed in accordance with the value of the idling detection signal C1, is sent out as the output S5 of the first-order delay circuit 14 as the target torque command TP until the time T0.

In this situation, as shown by S1 (self-axle speed) in FIG. 2, if idling occurs at a driving wheel axle at the time T0 and the acceleration S2 of the detected driving wheel axle having the maximum frequency exceeds the maximum acceleration threshold α1, the comparator circuit 10 sets the output level as the set level of the logical value "0" at substantially the same timing as the time T0.

When the output level S3 of the comparator circuit 10 becomes the set level of the logical value "0" at substantially the same timing as the time T0 at which the idling has occurred, the outputs of the multipliers 8 and 13 are set to the value "0" regardless of the value of the idling detection signal C1. Then, the delay time generating circuit 12 sets the output level as the aforementioned second level, which is the low level (hereinafter, ""L" level"), and starts the operation of maintaining it until a certain period of time TL elapses, as shown by S4 (the output of the delay time generating circuit) in FIG. 2.

Thus, the first-order delay circuit 14 performs a limiting operation at the starting point of the certain period of time TL to gradually reduce the target torque command TP that has been sent out immediately before, and the output S4 of the delay time generating circuit 12 is maintained at the "L" level until the time T3 for the certain period of time TL. Thus, the target torque command TP reaches the predetermined minimum value, for example, the value "0". In the example indicated by S5 (the target torque command TP) in FIG. 2, the target torque command TP=0 is established at the time T1.

With such a limiting process of the target torque command TP, as indicated by S1 (the axle speed) in FIG. 2, the speed that has been changing stops increasing and starts decreasing at the time T1 in the driving wheel axle having the maximum frequency in which idling has occurred at the time T0. Then, the acceleration S2 detected at the time T1 falls below the minimum acceleration threshold α2. The comparator circuit 10 performs an operation of returning the output level to the reset level of the logical value "1". Thus, the output of the multipliers 8 and 13 is no longer the value "0", but becomes a value corresponding to the idling detection signal C1, and the output of the multiplexer 13 is input to the first-order delay circuit 14.

However, the certain period of time TL during which the delay time generating circuit 12 maintains the output level at the "L" level is longer than duration of the time for which the comparator circuit 10 maintains the output level at the set level of the logical value "0". Thus, the delay time generating circuit 12 keeps the output level at the "L" level even after the comparator circuit 10 puts the output level back to the reset level.

Thus, the first-order delay circuit 14 continues to output the target torque command TP of the value "0", regardless of the output value of the multiplier 13. The small acceleration change that has appeared in the predetermined acceleration of the driving wheel axle having the maximum frequency, in which the idling has occurred at the time T0, disappears at the time T2, as shown by S1 (the self-axle speed) in FIG. 2. In other words, the idling is eliminated and disappears.

FIG. 2 also indicates the change of the acceleration S2 detected between the times T1 and T2. The comparator circuit 10 does not respond to the acceleration S2 detected between the times T1 and T2 because it is a value below the maximum acceleration threshold α1 and the minimum acceleration threshold α2.

Subsequently, the delay time generating circuit 12 boosts the output level to the "H" level at the time T3 after the certain period of time TL elapses. Then, as shown by S5 in FIG. 2, the first-order delay circuit 14 starts, at the end of the fixed period of time TL, an operation of gradually increasing the target torque command TP that has been reduced to the value "0" toward the predetermined value designated by the instruction torque command TP' that is output by the multiplier 13, within the time of the first-order delay element, and eventually returning it to the predetermined value. In FIG. 2, it returns to the predetermined value at time T4.

As described, the maximum acceleration threshold α1 is set for a small acceleration change in the driving wheel axle having the maximum frequency detected by the maximum frequency detecting circuit 3 such that a small acceleration change can be detected. Thus, even in a situation where idling occurs during an electric train car travels with a predetermined acceleration but the acceleration change is too small to detect the idling from the acceleration deviation, the idling can be reliably detected and a target torque command can be limited. This makes it possible to perform a suitable torque control quickly so as to cancel the idling, which improves the control performance of the electric train car.

Here, as indicated in FIG. 1, the maximum acceleration threshold $\alpha 1$ for the small acceleration change in the driving wheel axle having the maximum frequency is set by the absolute acceleration setting circuit 11, but the set value can be changed in accordance with various vehicle usage conditions. The maximum acceleration threshold $\alpha 1$ therefore can always be set at the optimal idling detection level. The minimum acceleration threshold $\alpha 2$ is provided to reset the comparator circuit 10, and thus is set to a suitable value for controlling.

The vehicle usage conditions that should be considered may be the following cases, (1) to (3).

(1) A vehicle usage condition that should be considered for a train of cars each equipped with the electric train car controlling device according to the present embodiment described above is a breakdown of any of the electric train car controlling devices. In such a case, because the maximum acceleration that can be achieved by the train of cars varies, the breakdown of the electric train car controlling device is checked with a vehicle monitoring device or the like, and the maximum acceleration that can be achieved by the train of cars is set to the absolute acceleration setting circuit 11. With this, the maximum acceleration threshold $\alpha 1$ that is the idling detection level, which has been modified from the one when all the electric train car controlling devices are normally working, and the associated minimum acceleration threshold $\alpha 2$ are set to the comparator circuit 10 by the absolute acceleration setting circuit 11.

(2) In a train of cars each equipped with the electric train car controlling device according to the above-described embodiment, the vehicle usage condition that should be considered is a specific driving mode adopted as an operational choice. The maximum acceleration that can be achieved by the train of cars in this situation is different from that of the train of cars in a regular driving mode. The maximum acceleration that can be achieved in the specific driving mode is set to the absolute acceleration setting circuit 11. With this, the absolute acceleration setting circuit 11 sets to the comparator circuit 10, the maximum acceleration threshold $\alpha 1$, which is the idling detection level modified from the maximum acceleration that can be achieved by the train of cars in the regular driving mode to the one in the specific driving mode, and the associated minimum acceleration threshold $\alpha 2$.

(3) In general, the frequency of idling occurrence tends to vary with the season of the year. For example, idling occurs more often during the rainy season in June and the season of fallen leaves in autumn than in other seasons. Thus, the vehicle usage conditions that should be considered for the train of cars each equipped with the electric train car controlling device according to the above-described embodiment is the season recognized by a calendar function provided in the vehicle monitoring device or the like. In such a case, the maximum acceleration that can be achieved by the train of cars in the recognized season is set to the absolute acceleration setting circuit 11. With this, the maximum acceleration threshold $\alpha 1$, which is the idling detection level modified in accordance with the recognized season, and the associated minimum acceleration threshold $\alpha 2$ are set to the comparator circuit 10 by the absolute acceleration setting circuit 11.

The idling control performed during the power running operation has been described in the above, but this processing is also applicable to sliding control during the braking operation that is a decelerating operation. In other words, because deceleration appears during decelerating operation, the characteristic line for the self-axle speed S1 indicated in FIG. 2 is on the downside. When sliding occurs, the speed changes in a further decreasing direction with respect to the deceleration for an electric train car.

This means that, in case of the sliding control, the relationship between the "maximum speed" and the "minimum speed" used in the idling control should be interchanged to apply it.

Thus, during the decelerating operation, the minimum frequency detecting circuit 2 and the maximum frequency detecting circuit 3 should be exchanged in the structure indicated in FIG. 1. The output of the maximum frequency detecting circuit 3 is supplied to the acceleration detecting circuits 4 and the speed difference detecting circuits 5, while the output of the minimum frequency detecting circuit 2 is supplied to the differentiator 6. The maximum deceleration threshold $\alpha 1$ and the minimum deceleration threshold $\alpha 2$ are supplied to the comparator 10. In this way, the sliding control can be similarly achieved.

In an actual electric train car controlling device, the units to which the minimum frequency detecting circuit 2 and the maximum frequency detecting circuit 3 are connected are switched as described above between the power running operation and the decelerating operation. In the aforementioned cases (1) to (3) in which the vehicle usage conditions are considered, the "maximum deceleration" is further defined for the decelerating operation.

INDUSTRIAL APPLICABILITY

As described above, the electric train car controlling device according to the present invention is useful in reliably controlling and canceling idling/sliding state to improve the control performance of an electric train car traveling with acceleration/deceleration determined in accordance with the vehicle usage condition, even when an acceleration/deceleration change is too small to detect it from an acceleration/deceleration deviation.

The invention claimed is:

1. An electric train car controlling device comprising a controlling unit that generates a target torque command value for a plurality of motors to suppress an idling state of driving wheels based on revolving speeds of the motors that drive a plurality of driving wheel axles, wherein
the controlling unit comprises:
a first judging unit that obtains, by use of self-axle speeds that are the revolving speeds of the motors and a reference speed that is a minimum speed of the revolving speeds of the motors, a speed deviation of each of the self-axle speeds from the reference speed and an acceleration deviation, and judges a degree of the idling state of the driving wheels in accordance with how much the thus obtained speed deviation and the acceleration deviation exceed thresholds that are individually determined;
a limiting process performing unit that performs a limiting process to reduce an instruction torque command value that is externally supplied, in accordance with a judgment result obtained by the first judging unit;
a second judging unit that determines a first threshold that exceeds an absolute acceleration determined in accordance with a vehicle usage condition with reference to the absolute acceleration, and judges whether an acceleration of a self-axle speed that is the maximum speed selected from the revolving speeds of the motors exceeds the first threshold; and an output processing unit that outputs a torque command value processed by the limiting process performing unit as the target torque command value when a judgment result obtained by the second judging unit is "not exceeding the first threshold", and outputs the target torque command value subjected to a reduction process that is performed regardless of a process result obtained by the limiting process performing unit when the judgment result obtained by the second judging unit is "exceeding the first threshold".

2. The electric train car controlling device according to claim 1, wherein the second judging unit is configured to determine, with reference to the absolute acceleration, a second threshold that is below the absolute acceleration, make the judgment on "exceeding the first threshold" when the acceleration or the deceleration exceeds the first threshold, thereafter maintain the judgment state of "exceeding the first threshold" during a period until the acceleration or the deceleration falls below the second threshold, and return to the judgment state of "not exceeding the first threshold" after the acceleration or the deceleration falls below the second threshold, and the controlling unit further comprises a process switching unit that does not supply the judgment result obtained by the first judging unit to the limiting process performing unit during a judgment period in which the second judging unit maintains the judgment state of "exceeding the first threshold, and a process managing unit that issues an instruction of taking in the process result of the limiting process performing unit to the output processing unit when the second judging unit is in the judgment state of "not exceeding the first threshold", and issues an instruction of starting the reduction process to the output processing unit when the second judging unit makes the judgment of "exceeding the first threshold".

3. The electric train car controlling device according to claim 1, wherein when the vehicle usage condition is such that the electric train car controlling devices are equipped on a train of cars and a breakdown occurs in any of the train car controlling devices, the absolute acceleration determined in accordance with the vehicle usage condition is set to be the maximum acceleration or the maximum deceleration that can be actually achieved by the train of cars, while checking the breakdown of the electric train car controlling device by a vehicle monitoring device.

4. The electric train car controlling device according to claim 1, wherein when the vehicle usage condition is such that the electric train car controlling devices are equipped on a train of cars and a specific driving mode is adopted, the absolute acceleration determined in accordance with the vehicle usage condition is set to be the maximum acceleration or the maximum deceleration that can be achieved by the train of cars in the specific driving mode.

5. The electric train car controlling device according to claim 1, wherein when the vehicle usage condition is such that the electric train car controlling devices are equipped on a train of cars and a season is recognized using a calendar function provided in a vehicle monitoring device, the absolute acceleration determined in accordance with the vehicle usage condition is set to be the maximum acceleration or the maximum deceleration that can be achieved by the train of cars in the recognized season.

6. An electric train car controlling device comprising a controlling unit that generates a target torque command value for a plurality of motors to suppress a sliding state of driving wheels based on revolving speeds of the motors that drive a plurality of driving wheel axles, wherein the controlling unit comprises:

a first judging unit that obtains, by use of self-axle speeds that are the revolving speeds of the motors and a reference speed that is a maximum speed of the revolving speeds of the motors, a speed deviation of each of the self-axle speeds from the reference speed and a deceleration deviation, and judges a degree of the sliding state of the driving wheels in accordance with how much the thus obtained speed deviation and the deceleration deviation exceed thresholds that are individually determined;

a limiting process performing unit that performs a limiting process to reduce an instruction torque command value that is externally supplied, in accordance with a judgment result obtained by the first judging unit;

a second judging unit that determines a first threshold that exceeds an absolute acceleration determined in accordance with a vehicle usage condition with reference to the absolute acceleration, and judges whether a deceleration of a self-axle speed that is the minimum speed selected from the revolving speeds of the motors exceeds the first threshold; and an output processing unit that outputs a torque command value processed by the limiting process performing unit as the target torque command value when a judgment result obtained by the second judging unit is "not exceeding the first threshold", and outputs the target torque command value subjected to a reduction process that is performed regardless of a process result obtained by the limiting process performing unit when the judgment result obtained by the second judging unit is "exceeding the first threshold".

7. The electric train car controlling device according to claim 6, wherein the second judging unit is configured to determine, with reference to the absolute acceleration, a second threshold that is below the absolute acceleration, make the judgment on "exceeding the first threshold" when the acceleration or the deceleration exceeds the first threshold, thereafter maintain the judgment state of "exceeding the first threshold" during a period until the acceleration or the deceleration falls below the second threshold, and return to the judgment state of "not exceeding the first threshold" after the acceleration or the deceleration falls below the second threshold, and the controlling unit further comprises a process switching unit that does not supply the judgment result obtained by the first judging unit to the limiting process performing unit during a judgment period in which the second judging unit maintains the judgment state of "exceeding the first threshold, and a process managing unit that issues an instruction of taking in the process result of the limiting process performing unit to the output processing unit when the second judging unit is in the judgment state of "not exceeding the first threshold", and issues an instruction of starting the reduction process to the output processing unit when the second judging unit makes the judgment of "exceeding the first threshold".

8. The electric train car controlling device according to claim 6, wherein when the vehicle usage condition is such that the electric train car controlling devices are equipped on a train of cars and a breakdown occurs in any of the train car controlling devices, the absolute acceleration determined in accordance with the vehicle usage condition is set to be the maximum acceleration or the maximum deceleration that can be actually achieved by the train of cars, while checking the breakdown of the electric train car controlling device by a vehicle monitoring device.

9. The electric train car controlling device according to claim 6, wherein when the vehicle usage condition is such that the electric train car controlling devices are equipped on a train of cars and a specific driving mode is adopted, the absolute acceleration determined in accordance with the vehicle usage condition is set to be the maximum acceleration or the maximum deceleration that can be achieved by the train of cars in the specific driving mode.

10. The electric train car controlling device according to claim 6, wherein when the vehicle usage condition is such that the electric train car controlling devices are equipped on a train of cars and a season is recognized using a calendar function provided in a vehicle monitoring device, the absolute acceleration determined in accordance with the vehicle usage condition is set to be the maximum acceleration or the maximum deceleration that can be achieved by the train of cars in the recognized season.

11. An electric train car controlling device comprising a controlling unit that generates a target torque command value for a plurality of motors to suppress an idling state of driving wheels based on revolving speeds of the motors that drive a plurality of driving wheel axles, wherein the controlling unit comprises:
a first judging unit that obtains, by use of self-axle speeds that are the revolving speeds of the motors and a reference speed that is a minimum speed of the revolving speeds of the motors, a speed deviation of each of the self-axle speeds from the reference speed and an acceleration deviation, and judges a degree of the idling state of the driving wheels in accordance with how much the thus obtained speed deviation and the acceleration deviation exceed thresholds that are individually determined;
a limiting process performing unit that performs a limiting process to reduce an instruction torque command value that is externally supplied, in accordance with a judgment result obtained by the first judging unit;
a second judging unit that is configured to determine a first threshold that exceeds an absolute acceleration determined in accordance with a vehicle usage condition and a second threshold that is below the absolute acceleration, with reference to the absolute acceleration, make a judgment of "exceeding the first threshold" when acceleration of a self-axle speed that is the maximum speed selected from the revolving speeds of the motors exceeds the first threshold, thereafter maintain the judgment state of "exceeding the first threshold" during a period until the acceleration falls below the second threshold, and return to the judgment state of "not exceeding the first threshold" after the acceleration falls below the second threshold;
a process switching unit that prevents the judgment result obtained by the first judging unit from being supplied to the limiting process performing unit during a judgment period in which the second judging unit maintains the judgment state of "exceeding the first threshold;
a process managing unit that issues an instruction of taking in the process result of the limiting process performing unit when the second judging unit is in the judgment state of "not exceeding the first threshold", and issues an instruction of starting a process and provides a processing period longer than the judgment period in which the second judging unit makes the judgment of "exceeding the first threshold"; and
an output processing unit that outputs, in response to the instruction of taking in, a torque command value processed by the limiting process performing unit as the target torque command value, performs, in response to the process starting instruction, a process of mildly reducing the target torque command value that is sent out immediately before toward a predetermined minimum value on a starting side of the processing period, and starts a process of mildly increasing the target torque command value from the predetermined minimum value toward a torque command value that is input by the limiting process performing unit on a termination side of the processing period, and thereby outputs the target torque command value subjected to a reduction process that is performed regardless of a process result obtained by the limiting process performing unit.

12. The electric train car controlling device according to claim 11, wherein when the vehicle usage condition is such that the electric train car controlling devices are equipped on a train of cars and a breakdown occurs in any of the train car controlling devices, the absolute acceleration determined in accordance with the vehicle usage condition is set to be the maximum acceleration or the maximum deceleration that can be actually achieved by the train of cars, while checking the breakdown of the electric train car controlling device by a vehicle monitoring device.

13. The electric train car controlling device according to claim 11, wherein when the vehicle usage condition is such that the electric train car controlling devices are equipped on a train of cars and a specific driving mode is adopted, the absolute acceleration determined in accordance with the vehicle usage condition is set to be the maximum acceleration or the maximum deceleration that can be achieved by the train of cars in the specific driving mode.

14. The electric train car controlling device according to claim 11, wherein when the vehicle usage condition is such that the electric train car controlling devices are equipped on a train of cars and a season is recognized using a calendar function provided in a vehicle monitoring device, the absolute acceleration determined in accordance with the vehicle usage condition is set to be the maximum acceleration or the maximum deceleration that can be achieved by the train of cars in the recognized season.

15. An electric train car controlling device comprising a controlling unit that generates a target torque command value for a plurality of motors to suppress a sliding state of driving wheels based on revolving speeds of the motors that drive a plurality of driving wheel axles, wherein the controlling unit comprises:
- a first judging unit that obtains, by use of self-axle speeds that are the revolving speeds of the motors and a reference speed that is a maximum speed of the revolving speeds of the motors, a speed deviation of each of the self-axle speeds from the reference speed and a deceleration deviation, and judges a degree of the sliding state of the driving wheels in accordance with how much the thus obtained speed deviation and the deceleration deviation exceed thresholds that are individually determined;
- a limiting process performing unit that performs a limiting process to reduce an instruction torque command value that is externally supplied, in accordance with a judgment result obtained by the first judging unit;
- a second judging unit that is configured to determine a first threshold that exceeds an absolute acceleration determined in accordance with a vehicle usage condition and a second threshold that is below the absolute acceleration, with reference to the absolute acceleration, make a judgment of "exceeding the first threshold" when deceleration of a self-axle speed that is the minimum speed selected from the revolving speeds of the motors exceeds the first threshold, thereafter maintain the judgment state of "exceeding the first threshold" during a period until the deceleration falls below the second threshold, and return to the judgment state of "not exceeding the first threshold" after the deceleration falls below the second threshold;
- a process switching unit that prevents the judgment result obtained by the first judging unit from being supplied to the limiting process performing unit during a judgment period in which the second judging unit maintains the judgment state of "exceeding the first threshold;
- a process managing unit that issues an instruction of taking in the process result of the limiting process performing unit when the second judging unit is in the judgment state of "not exceeding the first threshold", and issues an instruction of starting a process and provides a processing period longer than the judgment period in which the second judging unit makes the judgment of "exceeding the first threshold"; and
- an output processing unit that outputs, in response to the instruction of taking in, a torque command value processed by the limiting process performing unit as the target torque command value, performs, in response to the process starting instruction, a process of mildly reducing the target torque command value that is sent out immediately before toward a predetermined minimum value on a starting side of the processing period, and starts a process of mildly increasing the target torque command value from the predetermined minimum value toward a torque command value that is input by the limiting process performing unit on a termination side of the processing period, and thereby outputs the target torque command value subjected to a reduction process that is performed regardless of a process result obtained by the limiting process performing unit.

16. The electric train car controlling device according to claim 15, wherein
when the vehicle usage condition is such that the electric train car controlling devices are equipped on a train of cars and a breakdown occurs in any of the train car controlling devices, the absolute acceleration determined in accordance with the vehicle usage condition is set to be the maximum acceleration or the maximum deceleration that can be actually achieved by the train of cars, while checking the breakdown of the electric train car controlling device by a vehicle monitoring device.

17. The electric train car controlling device according to claim 15, wherein
when the vehicle usage condition is such that the electric train car controlling devices are equipped on a train of cars and a specific driving mode is adopted, the absolute acceleration determined in accordance with the vehicle usage condition is set to be the maximum acceleration or the maximum deceleration that can be achieved by the train of cars in the specific driving mode.

18. The electric train car controlling device according to claim 15, wherein
when the vehicle usage condition is such that the electric train car controlling devices are equipped on a train of cars and a season is recognized using a calendar function provided in a vehicle monitoring device, the absolute acceleration determined in accordance with the vehicle usage condition is set to be the maximum acceleration or the maximum deceleration that can be achieved by the train of cars in the recognized season.

* * * * *